(12) United States Patent
Cho et al.

(10) Patent No.: US 11,760,161 B2
(45) Date of Patent: Sep. 19, 2023

(54) HEAT PUMP SYSTEM FOR VEHICLE AND CONTROL METHOD THEREOF

(71) Applicants: Hyundai Motor Company, Seoul (KR); Kia Corporation, Seoul (KR)

(72) Inventors: Wan Je Cho, Hwaseong-si (KR); Yeonho Kim, Seoul (KR); Jae Yeon Kim, Hwaseong-si (KR); Namho Park, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 50 days.

(21) Appl. No.: 17/447,318

(22) Filed: Sep. 10, 2021

(65) Prior Publication Data

US 2022/0379686 A1 Dec. 1, 2022

(30) Foreign Application Priority Data

Jun. 1, 2021 (KR) .................. 10-2021-0070633

(51) Int. Cl.
*B60H 1/00* (2006.01)
*B60H 1/22* (2006.01)
*B60H 1/14* (2006.01)
*B60H 1/32* (2006.01)

(52) U.S. Cl.
CPC ......... *B60H 1/00899* (2013.01); *B60H 1/143* (2013.01); *B60H 1/2221* (2013.01); *B60H 2001/00928* (2013.01); *B60H 2001/00949* (2013.01); *B60H 2001/3255* (2013.01)

(58) Field of Classification Search
CPC .. B60H 1/00899; B60H 1/143; B60H 1/2221; B60H 2001/00928; B60H 2001/00949; B60H 2001/3255; B60H 1/00885; B60H 1/3213; B60H 1/0073; B60H 1/323; B60H 2001/3269
See application file for complete search history.

(56) References Cited

U.S. PATENT DOCUMENTS

| | | | | |
|---|---|---|---|---|
| 6,484,501 B1* | 11/2002 | Mieth | ................. | F25B 27/02 60/618 |
| 8,910,489 B2* | 12/2014 | Choi | ................. | B60H 1/143 62/185 |
| 9,233,592 B2* | 1/2016 | Larson | ............... | B60H 1/00392 |
| 10,252,599 B2* | 4/2019 | Kim | ................... | B60H 1/00385 |
| 10,427,495 B2* | 10/2019 | Suzuki | ................... | F25B 40/00 |

(Continued)

FOREIGN PATENT DOCUMENTS

DE 102011057059 A1 * 9/2012 ......... B60H 1/00921

*Primary Examiner* — Ljiljana V. Ciric
(74) *Attorney, Agent, or Firm* — MCDONNELL BOEHNEN HULBERT & BERGHOFF LLP

(57) ABSTRACT

A heat pump system for the vehicle includes a cooling apparatus, which includes a radiator and a water pump connected by a coolant line and circulating a coolant in the coolant line to cool at least one heating element provided on the coolant line. The heat pump system further includes a branched line including one end connected to a valve on the coolant line between the radiator and the heating element and the other end connected to the coolant line between the radiator and the water pump. The heat pump system further includes an air conditioner device circulating a refrigerant along the refrigerant line to adjust an indoor temperature of the vehicle.

10 Claims, 4 Drawing Sheets

(56) References Cited

U.S. PATENT DOCUMENTS

| | | | |
|---|---|---|---|
| 10,486,493 B2* | 11/2019 | Kim | B60H 1/32284 |
| 10,538,144 B2* | 1/2020 | Suzuki | B60H 1/00921 |
| 10,773,570 B2* | 9/2020 | Herbolzheimer | B60H 1/3213 |
| 11,241,940 B2* | 2/2022 | Lee | B60L 58/26 |
| 2016/0116192 A1* | 4/2016 | Kim | F25B 5/04 62/115 |
| 2020/0353793 A1* | 11/2020 | Choi | F25B 25/005 |
| 2020/0381757 A1* | 12/2020 | Jia | B01D 53/04 |

* cited by examiner

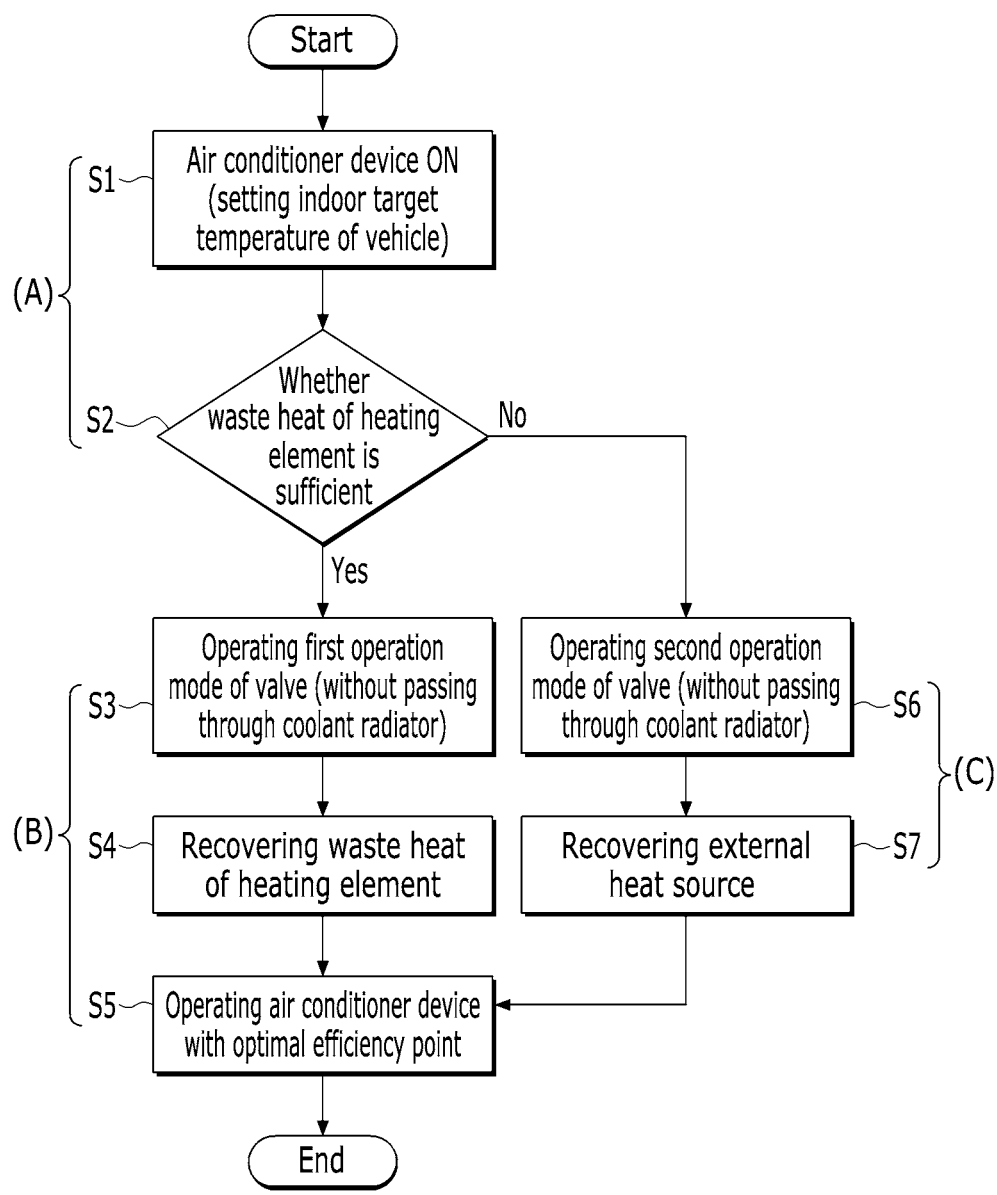

HEAT PUMP SYSTEM FOR VEHICLE AND CONTROL METHOD THEREOF

CROSS-REFERENCE TO RELATED APPLICATION

This application claims priority to and the benefit of Korean Patent Application No. 10-2021-0070633 filed in the Korean Intellectual Property Office on Jun. 1, 2021, the entire contents of which are incorporated herein by reference.

TECHNICAL FIELD

The present disclosure relates to a heat pump system for a vehicle and a control method thereof. More particularly, the present disclosure relates to a heat pump system for a vehicle that selectively uses an external heat source according to an external temperature and an amount of heat generated by a heating element in a vehicle's heating mode to improve heating efficiency.

BACKGROUND

Generally, an air condition system for a vehicle includes an air conditioner device circulating a refrigerant in order to heat or cool an interior of the vehicle.

The air conditioner device, which is to maintain the interior of the vehicle at an appropriate temperature regardless of a change in an external temperature to maintain a comfortable interior environment, is configured to heat or cool the interior of the vehicle by heat exchange by an evaporator in a process in which a refrigerant discharged by driving of a compressor is circulated to the compressor through a condenser, a receiver drier, an expansion valve, and the evaporator.

That is, the air conditioner device lowers temperature and humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

On the other hand, nowadays, while interest in energy efficiency and environment pollution problem increases, development of an environmentally-friendly vehicle that can substantially replace an internal combustion engine vehicle is requested, and such an environmentally-friendly vehicle is classified into an electric vehicle that is driven using a fuel cell or electricity as a power source and a hybrid vehicle that is driven using an engine and an electric battery.

In the electric vehicle or the hybrid vehicle among these environmentally friendly vehicles, a separate heater is not used, unlike an air conditioner of a general vehicle, and an air conditioner used in the environmentally friendly vehicle is generally called a heat pump system.

Meanwhile, the electric vehicle generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling device, a heat pump system, and a battery cooling system should be configured using separate closed circuits, respectively, so as to prevent heat generation of the motor, an electrical component, and the battery including the fuel cells.

Accordingly, size and weight of a cooling module disposed at the front of the vehicle are increased, and a layout of connection pipes supplying a coolant or a refrigerant to each of the heat pump system, the cooling device, and the battery cooling system in an engine compartment becomes complicated.

In addition, when the external temperature is very low in the vehicle's heating mode, it is difficult to recover waste heat from the heating element including an electrical component and a battery module, so there is a problem that the performance of the heat pump system is deteriorated.

The above information disclosed in this Background section is only for enhancement of understanding of the background of the disclosure, and therefore it may contain information that does not form the prior art that is already known in this country to a person of ordinary skill in the art.

SUMMARY

Therefore, the present disclosure was invented to solve the problem as described above, and the problem to be solved by the present disclosure is to provide a heat pump system for a vehicle which selectively uses an external heat source according to the external temperature and the amount of heat of the heating element in the heating mode of the vehicle to improve heating efficiency.

A heat pump system for a vehicle according to an embodiment of the present disclosure includes: a cooling apparatus including a radiator and a water pump connected by a coolant line and circulating a coolant in the coolant line so as to cool at least one heating element provided on the coolant line; a branched line including one end connected to a valve on the coolant line between the radiator and the heating element and the other end connected to the coolant line between the radiator and the water pump; and an air conditioner device circulating a refrigerant along the refrigerant line so as to adjust an indoor temperature of the vehicle, wherein the heat-exchanger provided on the air conditioner device is connected to the coolant line and evaporates the refrigerant through heat-exchange with the coolant supplied through the coolant line in a heating mode of the vehicle, and the branched line is selectively opened or closed by the valve operated with at least one operation mode depending on a temperature of the heating element in the heating mode of the vehicle.

The air conditioner device may include a condenser connected through the refrigerant line and condensing the refrigerant; an expansion valve connected to the condenser through the refrigerant line and expanding the refrigerant; and a compressor connected to the heat-exchanger through the refrigerant line and compressing the refrigerant, and the heat-exchanger is provided on the refrigerant line between the expansion valve and the compressor and selectively recovers the waste heat of the heating element or an external heat source while evaporating the refrigerant through the heat-exchange with the coolant inflowed through the coolant line.

The external heat source may be recovered from the coolant through heat-exchange of the coolant passing through the radiator and the outside air.

The at least one operation mode may include: a first operation mode operated in a case that an amount of heat generated by the heating element is sufficient in a state that an external temperature is an extremely low temperature; and a second operation mode operated in a case that an amount of heat generated by the heating element is insufficient in a state that an external temperature is an extremely low temperature.

In the first operation mode, the valve may open the branched line and close the coolant line connected to the radiator based on the branched line.

In the second operation mode, the valve may close the branched line and open the coolant line connected to the radiator based on the branched line.

The air conditioner device may be operated so that the refrigerant is recirculated along the refrigerant line in the first operation mode, or the second operation mode.

In the first operation mode, the heat-exchanger may recover the waste heat of the heating element, and in the second operation mode, the heat-exchanger may indirectly recover the external heat source recovered from the radiator.

The cooling apparatus, the air conditioner device, and the valve may be electrically connected to the controller.

The controller may control the operation of the valve according to the indoor temperature of the vehicle predetermined by the user in the heating mode of the vehicle and the amount of heat generated by the heating element.

A control method of a heat pump system for a vehicle including: a cooling apparatus including a radiator, a water pump, and a heating element mutually connected by a coolant line; a branched line connected to the coolant line through a valve; a heat-exchanger connected to the coolant line; and an air conditioner device including a compressor, a condenser, and an expansion valve mutually connected to the heat-exchanger through the refrigerant line, and to control the heat pump system during a heating mode operation of the vehicle in the heat pump system for the vehicle controlled by the controller according to an embodiment of the present disclosure, includes: setting an indoor temperature of the vehicle by a user during the driving of the vehicle, and determining an amount of heat generated by the heating element by the controller; controlling an operation of the valve by the controller so as to recover waste heat of the heating element depending on the determined amount of heat generated by the heating element, and ending the controlling while operating the air conditioner device; and controlling an operation of the valve by the controller so as to recover external heat depending on the determined amount of heat generated by the heating element, and ending the controlling while operating the air conditioner device.

The setting and determining may include: operating the air conditioner device for heating the vehicle according to an operation or a setting of the user while the vehicle is driving; and determining whether the waste heat of the heating element is sufficient by detecting the amount of heat generated by the heating element by the controller.

In the operation of the air conditioner device, the user may set an indoor target temperature of the vehicle.

The controlling of the operation of the valve so as to recover the waste heat may include: operating the valve with the first operation mode by the controller if it is determined that the waste heat of the heating element is sufficient; recovering the waste heat of the heating element from the heat-exchanger; and operating the air conditioner device with an optimal efficiency point and terminating the controlling by the controller.

In the first operation mode, the controller may operate the valve so as to open the branched line and close the coolant line connected to the radiator based on the branched line.

In the recovering of the waste heat of the heating element from the heat-exchanger, the heat-exchanger may recover the waste heat of the heating element while heat-exchanging the coolant with the temperature increased while passing through the heating element with the refrigerant.

The controlling of the operation of the valve so as to recover the external heat source may include, if it is determined that the waste heat of the heating element is insufficient (if the condition is not satisfied): operating the valve with the second operation mode by the controller; and recovering the external heat from the heat-exchanger.

In the operation of the valve with the second operation mode, the controller may operate the valve so as to open the branched line and open the coolant line connected to the radiator based on the branched line.

In the recovering of the external heat from the heat-exchanger, the heat-exchanger may indirectly recover the external heat source recovered from the coolant through heat-exchange with the outside air while passing through the radiator through the heat-exchange of the coolant and the refrigerant.

If the recovering of the external heat from the heat-exchanger is completed, the controller may operate the air conditioner device with an optimal efficiency point and terminate the controlling.

Accordingly, as above-described, according to the heat pump system for the vehicle and the control method thereof according to an embodiment of the present disclosure, in the heating mode of the vehicle, it is possible to improve the heating efficiency by selectively using the external heat source according to the amount of heat generated by the heating element, and to prevent deterioration of the system's performance in advance.

In addition, the present disclosure promotes simplification and ease of the entire system by applying one heat-exchanger where the coolant and the refrigerant are heat-exchanged so that the cooling apparatus through which the coolant is circulated and the air conditioner device are interlocked.

In addition, the present disclosure may enable an optimal performance of the heating element by efficiently controlling the temperature of the heating element, and improve the overall marketability of the vehicle through the efficient temperature management of the heating element, and increase a travel distance.

Furthermore, through the simplification of the entire system, it is possible to reduce a manufacturing cost and weight, and to improve space utilization.

BRIEF DESCRIPTION OF THE DRAWINGS

FIG. 4 is a control flowchart to explain a control method of a heat pump system for a vehicle according to an embodiment of the present disclosure.

DETAILED DESCRIPTION

Figure 1:
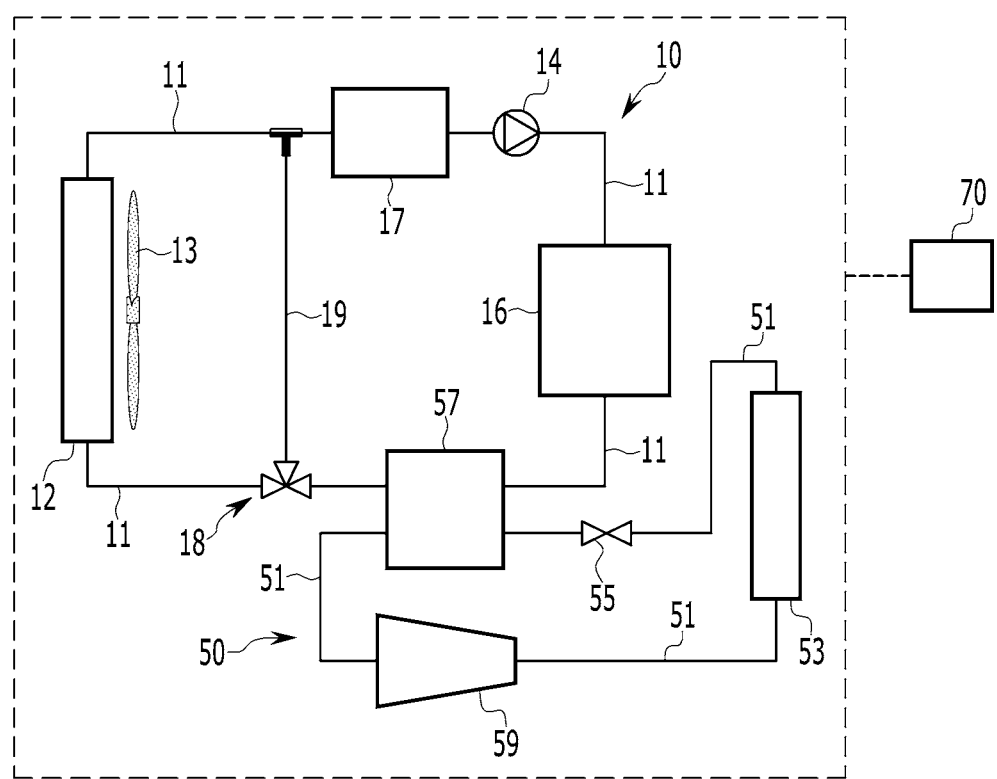
FIG. 1 is a block diagram of a heat pump system for a vehicle according to an embodiment of the present disclosure.

An embodiment of the present disclosure will hereinafter be described in detail with reference to the accompanying drawings.

Prior to the detailed descriptions, while the present disclosure will be described in connection with what is presently considered to be practical embodiments, it is to be understood that the present disclosure is not limited to the disclosed embodiments, but, on the contrary, is intended to cover various modifications and equivalent arrangements included within the spirit and scope of the appended claims.

Components unrelated to the description will be omitted in order to obviously describe the present disclosure, and like reference numerals will be used to describe like components throughout the present specification.

Further, in the drawings, the sizes and the thicknesses of the components are exemplarily provided for convenience of description, but the present disclosure is not limited to those shown in the drawings, and the thicknesses are exaggerated to clearly show several parts and regions.

In addition, unless explicitly described to the contrary, the word "comprise", and variations such as "comprises" or "comprising", will be understood to imply the inclusion of stated elements but not the exclusion of any other elements.

Furthermore, each of terms, such as ' . . . unit', ' . . . means', ' . . . part', and ' . . . member' described in the specification, mean a unit of a comprehensive element that performs at least one function or operation.

FIG. 1 is a block diagram of a heat pump system for a vehicle according to an embodiment of the present disclosure.

The heat pump system for the vehicle according to an embodiment of the present disclosure improves heating efficiency by selectively using an external heat source according to an external temperature and an amount of heat generated by a heating element 16 in a heating mode of the vehicle.

This heat pump system may be applied to an electric vehicle.

Referring to FIG. 1, the heat pump system may include a cooling apparatus 10, a branched line 19, and an air conditioner device 50.

First, the cooling apparatus 10 includes a radiator 12, a water pump 14, a heating element 15, and a reservoir tank 17 that are connected through a coolant line 11.

The radiator 12 is disposed at the front of the vehicle, the cooling fan 13 is provided at the rear, and the coolant is cooled through the operation of the cooling fan 13 and the heat-exchange with the outside air.

Also, the heating element 15 may include an electric power control unit (EPCU), a motor, an inverter, or an on-board charger (OBC), and an oil cooler connected to the motor.

The heating element 15 configured in this way is provided in the coolant line 11 and may be cooled by a water-cooling type.

Accordingly, when the waste heat of the heating element 15 is recovered in the heating mode of the vehicle, heat generated from the electric power control unit, the motor, the inverter, or the charger may be recovered.

Also, between the radiator 12 and the water pump 14, the reservoir tank 17 is equipped on the coolant line 11. The coolant cooled by the radiator 12 may be stored in the reservoir tank 17.

This cooling apparatus 10 may circulate the coolant into the coolant line 11 through the operation of the water pump 14 so that the coolant is supplied to the heating element 16 provided in the coolant line 11.

Here, the water pump 14 may be an electric water pump.

In the present embodiment, the branched line 19 may be provided in the cooling apparatus 10. This branched line 19 may be connected to the coolant line between the radiator 12 and the water pump 14 through a valve 18 provided in the coolant line 11 between the radiator 12 and the heating element 16.

That is, one end of the branched line 19 is connected to the valve 18 provided in the coolant line 11 between the radiator 12 and the heating element 16. The other end of the branched line 19 may be connected to the coolant line 11 between the radiator 12 and the water pump 14.

In the present embodiment, the other end of the branched line 19 is connected to the coolant line 11 connecting the radiator 12 and the reservoir tank 17.

Here, the valve 18 may be a 3-way valve capable of distributing a flow rate.

The branched line 19 configured in this way may be selectively opened and closed by the valve 18 operating in at least one operation mode according to the temperature of the heating element 15 in the heating mode of the vehicle.

Here, at least one operation mode may include a first operation mode and a second operation mode.

First, the first operation mode may be operated when the amount of heat generated by the heating element 16 is sufficient in the heating mode of the vehicle.

In the first operation mode, the valve 18 may open the branched line 19 and close the coolant line 11 connected to the radiator 12 based on the branched line 19.

The second operation mode may be operated when the external temperature is an extremely low temperature in the heating mode of the vehicle and the amount of heat of the heating element 16 is not sufficient.

In the second operation mode, the valve 18 may close the branched line 19 and open the coolant line 11 connected to the radiator 12 based on the branched line 19.

That is, the branched line 19 is selectively opened through the operation of the valve 18 when the temperature of the coolant is increased by absorbing the waste heat generated by the heating element 16. At this time, the coolant line 11 connected to the radiator 12 is closed through the operation of the valve 18.

Then, the coolant circulating along the branched line 19 and the opened coolant line 11 may keep the temperature elevated while cooling the heating element 16 without passing the radiator 12.

On the contrary, the branched line 19 is closed through the operation of the valve 18 when the waste heat generated by the heating element 16 is insufficient and the external temperature is an extremely low temperature. At this time, the coolant line 11 connected to the radiator 12 is opened through the operation of the valve 18.

Then, the coolant circulating along the coolant line 11 may absorb the external heat through heat-exchange with the outside air in the radiator 12 after passing through the heating element 16.

In the present embodiment, the air conditioner device 50 may circulate the refrigerant along the refrigerant line 51 to adjust the indoor temperature of the vehicle.

This air conditioner device 50 includes a condenser 53, an expansion valve 55, a heat-exchanger 57, and a compressor 59, that are connected through the refrigerant line 51.

First, the condenser 53 is connected to the refrigerant line 51 and the refrigerant passes through it. This condenser 53 may condense the refrigerant supplied from the compressor 59.

The expansion valve 55 is connected to the condenser 53 through the refrigerant line 51 and may selectively expand the refrigerant.

In the present embodiment, the heat-exchanger 57 is connected to the expansion valve 55 through the refrigerant line 51. The heat-exchanger 57 is connected to the coolant line 11 and may evaporate the refrigerant through heat-exchange with the coolant supplied through the coolant line 11 in the heating mode of the vehicle.

Here, the heat-exchanger 57 may be provided in the coolant line 11 between the heating element 16 and the valve 18.

Also, the heat-exchanger 57 may be provided in the refrigerant line 51 between the expansion valve 55 and the compressor 59.

That is, the heat-exchanger 57 selectively recovers the waste heat of the heating element 16 or the external heat while evaporating the refrigerant through the heat-exchange with the coolant inflowed through the coolant line 11.

Meanwhile, the external heat is recovered from the coolant through the heat-exchange of the coolant passing through the radiator 12 and the outside air. Accordingly, the heat-exchanger 57 may indirectly recover the external heat through the heat-exchange of the coolant that has recovered the external heat and the refrigerant according to the operation mode of the vehicle.

The heat-exchanger 57 configured in this way may be a water-cooled heat-exchanger into which the coolant is inflowed.

The compressor 59 is connected through the refrigerant line 51 between the heat-exchanger 57 and the condenser 53. This compressor 59 compresses the refrigerant in a gas state and may supply the compressed refrigerant to the condenser 53.

Here, the expansion valve 55 may be an electronic expansion valve that selectively expands the refrigerant while controlling the flow of the refrigerant passing through the refrigerant line 51.

The air conditioner device 50 configured in this way may be operated such that the refrigerant is circulated along the refrigerant line 51 in the first operation mode or the second operation mode.

That is, in the first operation mode, the heat-exchanger 57 may recover the waste heat of the heating element 16 through heat-exchange of the coolant and the refrigerant.

Also, in the second operation mode, the heat-exchanger 57 may indirectly recover the external heat recovered from the radiator 12 through heat-exchange of the coolant and the refrigerant.

That is, in the second operation mode, the cooling apparatus 10 recovers the external heat while cooling the coolant in the radiator 12 through heat-exchange with the outside air. The recovered external heat may be recovered indirectly through heat-exchange of the refrigerant and the coolant in the heat-exchanger 57.

Accordingly, the overall performance and heating efficiency of the heat pump system may be improved by using the waste heat of the heating element 16 or the external heat recovered from the heat-exchanger 57 for the indoor heating of the vehicle.

The cooling apparatus 10, the air conditioner device 50, and the valve 18 configured in this way may be electrically connected to the controller 70.

Here, the controller 70 may control the operation of the valve 18 according to the indoor temperature of the vehicle predetermined by the user in the heating mode of the vehicle and the amount of heat generated by the heating element 16.

That is, the controller 70 controls the operation of the valve 18 in the first operation mode or the second operation mode as described above according to the indoor temperature of the vehicle predetermined by the user in the vehicle heating mode, the amount of heat generated by the heating element 16, and the external temperature.

This controller 70 may be implemented as at least one processor operating according to a predetermined program, and the predetermined program may include instructions for performing each step included in the control method of the heat pump system according to an embodiment of the present disclosure to be described later.

Hereinafter, the operation and action of the vehicle heat pump system according to an embodiment of the present disclosure configured as described above is described with reference to FIG. 2 and FIG. 3.

First, the operation for recovering the waste heat of the heating element 16 when the heating mode of the vehicle is performed in the heat pump system for the vehicle according to an embodiment of the present disclosure is described with reference to FIG. 2.

Figure 2:
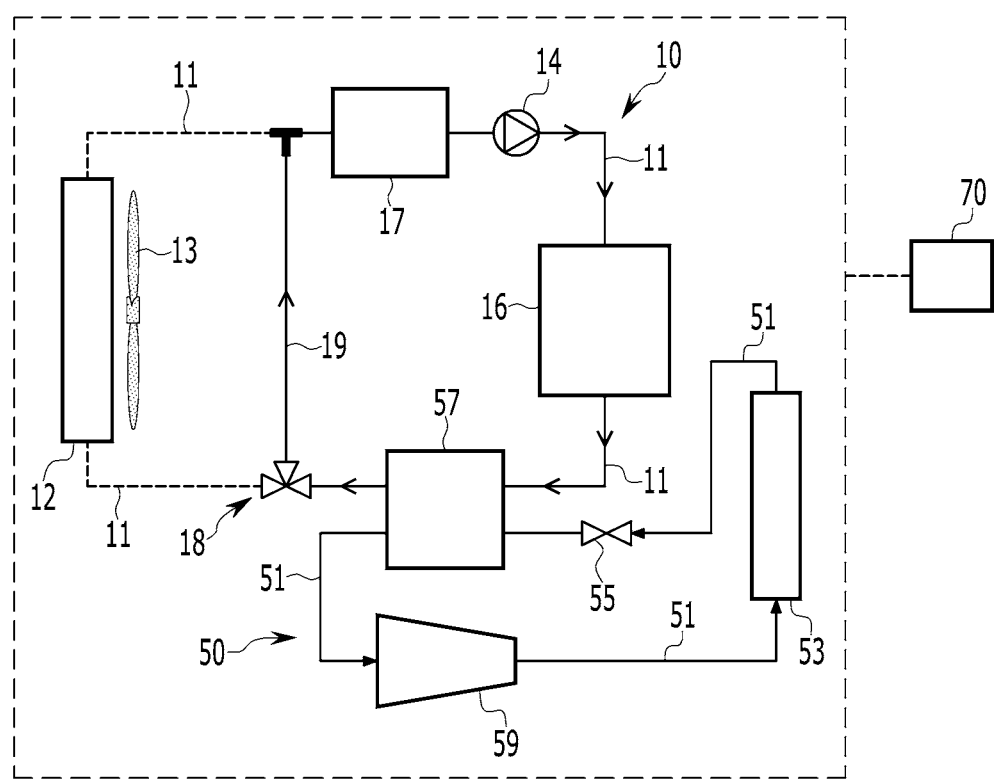
FIG. 2 is an operation state diagram for recovery of waste heat of a heating element according to a heating mode of a vehicle in a heat pump system for a vehicle according to an embodiment of the present disclosure.

FIG. 2 is an operation state diagram for a recovery of waste heat of a heating element according to a heating mode of a vehicle in a heat pump system for a vehicle according to an embodiment of the present disclosure.

Referring to FIG. 2, in the heating mode of the vehicle, when the external temperature is generally a low temperature and the waste heat of the heating element 16 is sufficient, the controller 70 may perform the first operation mode.

Accordingly, the valve 18 opens the branched line 19 according to the control signal of the controller 70, and closes the coolant line 11 connected to the radiator 12 based on the branched line 19.

Then, in the cooling apparatus 10, the coolant circulates along the opened coolant line 11 and the opened branched line 19 through the operation of the water pump 14.

At this time, the air conditioner device 50 may circulate the refrigerant through the operation of each constituent element.

That is, the cooling apparatus 10 recovers the waste heat of the heating element 15 while cooling the heating element 16 by using the coolant. The coolant of which the temperature has increased while cooling the heating element 16 may be recovered through the heat-exchange with the refrigerant in the heat-exchanger 57 without passing the radiator 12.

Accordingly, in the heating mode of the vehicle, the first operation mode may be used for the indoor heating of the vehicle by using the waste heat of the heating element 15.

That is, in the state that the waste heat of the heating element 16 is sufficient and the external temperature is the general low temperature, if the heat pump system is operated, the controller 70 opens the branched line 19 and closes the coolant line 11 connected to the radiator 12 through the operation control of the valve 18.

Accordingly, the coolant recovers the waste heat from the heating element 16 without passing the radiator 12 along the opened coolant line 11 and branched line 19, thereby the temperature is increased.

Therefore, in the first operation mode, the controller 70 may prevent the coolant that has recovered the waste heat from the heating element 16 from being cooled while passing through the radiator 12 exposed to a low temperature environment.

The coolant with increased temperature is recovered through the heat-exchange with the refrigerant in the heat-exchanger 57 and may be efficiently used for the indoor heating of the vehicle.

That is, in the present disclosure, while repeating the above-described process, the waste heat generated from the heating element 16 is recovered and used for indoor heating, thereby reducing the power consumption and improving the overall heating efficiency.

Also, the operation for recovering the external heat source when performing the heating mode of the vehicle in the vehicle heat pump system according to an embodiment of the present disclosure is described with reference to FIG. 3.

Figure 3:
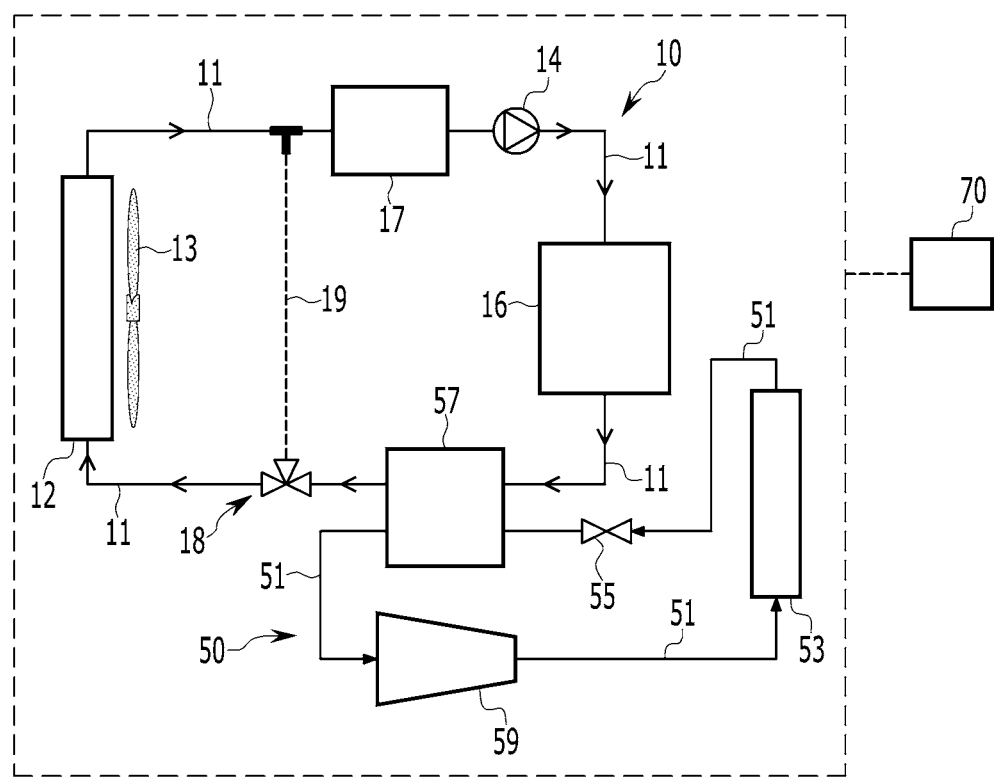
FIG. 3 is an operation state diagram for a recovery of external heat according to a heating mode of a vehicle in a heat pump system for a vehicle according to an embodiment of the present disclosure.

FIG. 3 is an operation state diagram for a recovery of external heat according to a heating mode of a vehicle in a heat pump system for a vehicle according to an embodiment of the present disclosure.

Referring to FIG. 3, in the heating mode of the vehicle, when the external temperature is the extremely low temperature and the waste heat of the heating element 16 is insufficient, the controller 70 may perform the second operation mode.

Accordingly, the valve 18 closes the branched line 19, and opens the coolant line 11 connected to the radiator 12 based on the branched line 19 according to the control signal of the controller 70.

Then, in the cooling apparatus 10, the coolant circulates along the coolant line 11 through the operation of the water pump 14.

That is, the coolant that has passed through the heating element 16 may recover the external heat through the heat-exchange with the outside air while passing through the radiator 12.

At this time, the air conditioner device 50 may circulate the refrigerant through the operation of each constituent element.

That is, the cooling apparatus 10 may recover the waste heat of the heating element 15 while cooling the heating element 16 by using the coolant, and simultaneously recover the external heat from outside air while passing through the radiator 12.

The coolant of which the temperature has increased by recovering the waste heat of the heating element 16 and the external heat may be recovered through the heat-exchange with the refrigerant in the heat-exchanger 57.

Accordingly, in the heating mode of the vehicle, the second operation mode may be used for the indoor heating of the vehicle by indirectly using the waste heat of the heating element 15 and the external heat.

That is, when the waste heat generated from the heating element 16 is remarkably insufficient at an extremely low external temperature that is the external temperature, the heat pump system indirectly recovers the external heat through the radiator 12 together with the waste heat of the heating element 16 to be used for the indoor heating of the vehicle.

Accordingly, in the heating mode of the vehicle, the second operation mode may heat the interior of the vehicle using the waste heat of the heating element 15 and the external heat.

That is, if the waste heat of the heating element 16 is not sufficient and the heat pump system operates in a state where the external temperature is extremely low, the controller 70 closes the branched line 19 through the operation control of the valve 18 and opens the coolant line 11 connected to the radiator 12.

Accordingly, the coolant recovers the waste heat from the heating element 16 along the opened coolant line 11, and simultaneously recovers the external heat while passing through the radiator 12, thereby increasing the temperature.

The recovered external heat and waste heat of the heating element 16 may be indirectly recovered through heat-exchange of the refrigerant and coolant in the heat-exchanger 57.

Therefore, in the second operation mode, the controller 70 may indirectly recover the external heat together with the waste heat of the heating element 16 through the operation control of the valve 18 to increase the temperature of the coolant.

The coolant with increased temperature is recovered through the heat-exchange with the refrigerant in the heat-exchanger 57, thereby being efficiently used for the indoor heating of the vehicle.

That is, the present disclosure may reduce the power consumption and improve the overall heating efficiency by recovering the external heat together with the waste heat of the heating element 16 to be used for the indoor heating while repeating the process as described above.

On the other hand, the control method of the heat pump system for the vehicle according to an embodiment of the present disclosure is described with reference to FIG. 4.

FIG. 4 is a control flowchart to explain a control method of a heat pump system for a vehicle according to an embodiment of the present disclosure.

Referring to FIG. 4, in the heat pump system configured as above-described, to control the heat pump system during the heating mode operation of the vehicle, a process (A) in which the user sets the indoor temperature of the vehicle while the vehicle is driving, and the controller determines the amount of heat generated by the heating element; a process (B) in which the controller controls the operation of the valve to recover the waste heat of the heating element according to the amount of heat generated by the heating element determined through the process (A), and ends the control while operating the air conditioner device; and a process (C) in which the controller controls the operation of the valve to recover the external heat source according to the amount of heat generated by the heating element determined through the process (A), and ends the control while operating the air conditioner device are included.

In the present embodiment, the process (A) may include the following steps.

First, the air conditioner device 50 is operated for the heating of the vehicle according to the user's operation or setting while the vehicle is driving (S1).

Here, in the step (S1) in which the air conditioner device 50 is operated, an indoor target temperature of the vehicle may be set.

In this state, the controller 70 detects the amount of heat generated by the heating element 16 to determine whether the waste heat of the heating element 16 is sufficient (S2).

In the step (S2) of determining whether the waste heat of the heating element 16 is sufficient, if it is determined that the waste heat of the heating element 16 is sufficient (i.e., the condition is satisfied), the controller 70 performs the process (B).

In the process (B), if it is determined that the waste heat of the heating element 16 is sufficient through the process (A), the controller 70 operates the valve 18 with the first operation mode (S3).

In the first operation mode, the controller 70 may operate the valve 18 so that the branched line 19 is opened and the coolant line 11 connected to the radiator 12 based on the branched line 19 is closed.

In this state, the heat-exchanger 57 recovers the waste heat of the heating element 16 (S4).

That is, as described above, in the cooling apparatus 10, the coolant temperature increases while the coolant cools the heating element 16 along the branched line 19 and the coolant line 11 that are opened without passing the radiator 12.

At this time, the heat-exchanger 57 recovers the waste heat of the heating element 16 while evaporating the refrigerant through the heat-exchange with the coolant whose the temperature is increased through the coolant line 11.

That is, in the step (S4) of recovering the waste heat of the heating element 16 in the heat-exchanger 57, the heat-exchanger 57 may heat-exchange the coolant whose the temperature is increased while passing the heating element 16 with the refrigerant and the heating to recover the waste heat of the heating element 16.

Then, the controller 70 operates the air conditioner device 50 with an optimum efficiency point by using the waste heat of the heating element 16 recovered from the heat-exchanger 57 and terminates the control (S5).

Meanwhile, in the step (S2) of determining whether the waste heat of the heating element 16 is sufficient, if it is determined that the waste heat of the heating element 16 is insufficient (i.e., if the condition is satisfied), the controller 70 performs the process (C)

In the process (C), if it is determined that the waste heat of the heating element 16 is not sufficient (condition is not satisfied) through the process (A), the controller 70 operates the valve 18 with the second operation mode (S6).

In the step (S6) of operating the valve 18 with the second operation mode, the controller 70 may open the branched line 19 and operate the valve 18 so that the coolant line 11 connected to the radiator 12 based on the branched line 19 is opened.

Then, the coolant circulating along the coolant line 11 may absorb the external heat through the heat-exchange with the outside air at the radiator 12 after passing through the heating element 16.

Then, the heat-exchanger 57 recovers the external heat S7.

Here, the heat-exchanger 57 may indirectly recover the external heat through the heat-exchange of the coolant and the refrigerant that have recovered the external heat.

That is, in the step (S7) of recovering the external heat from the heat-exchanger 57, the heat-exchanger 57 indirectly recovers the external heat that is recovered from the coolant through the heat-exchange with the outside air while passing through the radiator 12 through the heat-exchange of the coolant and the refrigerant.

Then, the controller 70 operates the air conditioner device 50 to the optimum efficiency point by using the external heat recovered from the heat-exchanger 57 and the waste heat of the heating element 16, and ends the control (S5).

As such, the heat pump system control method for the vehicle according to an embodiment of the present disclosure operates in the first operation mode or the second operation mode in the heating mode of the vehicle while performing each of the above-described steps, thereby selectively using the waste heat of the heating element 16, or the external heat for the indoor heating of the vehicle.

Accordingly, as above-described, according to the heat pump system for the vehicle and the control method thereof according to an embodiment of the present disclosure, in the heating mode of the vehicle, it is possible to improve the heating efficiency by selectively using the external heat according to the amount of heat generated by the heating element 16, and to prevent a deterioration of the system's performance in advance.

In addition, the present disclosure promotes simplification and ease of the entire system by applying the heat-exchanger 57 where the coolant and the refrigerant are heat-exchanged so that the cooling apparatus 10 through which the coolant is circulated and the air conditioner device 50 are interlocked.

In addition, the present disclosure may enable optimal performance of the heating element 16 by efficiently controlling the temperature of the heating element 16, and improve the overall marketability of the vehicle through the efficient temperature management of the heating element 16, and increase a travel distance.

Furthermore, through the simplification of the entire system, it is possible to reduce manufacturing cost and weight, and to improve space utilization.

While the present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims.

What is claimed is:

1. A control method of a heat pump system for a vehicle including: a cooling apparatus including a radiator, a water pump, and a heating element mutually connected by a coolant line; a branched line connected to the coolant line through a valve; a heat-exchanger connected to the coolant line; and an air conditioner device including a compressor, a condenser, and an expansion valve mutually connected to the heat-exchanger through a refrigerant line, and to control the heat pump system during a heating mode operation of the vehicle in the heat pump system for the vehicle controlled by a controller, comprising:

setting an indoor temperature of the vehicle by a user during driving of the vehicle, and determining the amount of heat generated by the heating element by the controller;

controlling operation of the valve by the controller so as to recover waste heat of the heating element depending on the determined amount of heat generated by the heating element, and ending the controlling while operating the air conditioner device; and controlling operation of the valve by the controller so as to recover external heat depending on the determined amount of heat generated by the heating element, and ending the controlling while operating the air conditioner device.

2. The control method of the heat pump system for the vehicle of claim 1, wherein
the setting and determining includes:
operating the air conditioner device for heating the vehicle according to an operation or a setting of the user while the vehicle is driving; and determining whether the waste heat of the heating element is sufficient by detecting the amount of heat generated by the heating element by the controller.

3. The control method of the heat pump system for the vehicle of claim 2, wherein
in the operation of the air conditioner device,
the user sets an indoor target temperature of the vehicle.

4. The control method of the heat pump system for the vehicle of claim 1, wherein
the controlling of the operation of the valve so as to recover the waste heat includes:
operating the valve with a first operation mode by the controller if it is determined that the waste heat of the heating element is sufficient;
recovering the waste heat of the heating element from the heat-exchanger; and
operating the air conditioner device with an optimal efficiency point and terminating the controlling by the controller.

5. The control method of the heat pump system for the vehicle of claim 4, wherein
in the first operation mode, the controller operates the valve so as to open the branched line and close the coolant line connected to the radiator based on the branched line.

6. The control method of the heat pump system for the vehicle of claim 4, wherein
in the recovering of the waste heat of the heating element from the heat-exchanger,
the heat-exchanger recovers the waste heat of the heating element while heat-exchanging the coolant with the temperature increased while passing through the heating element with a refrigerant.

7. The control method of the heat pump system for the vehicle of claim 1, wherein
the controlling of the operation of the valve so as to recover an external heat source includes,
if it is determined that the waste heat of the heating element is insufficient,
operating the valve with a second operation mode by the controller; and
recovering the external heat from the heat-exchanger.

8. The control method of the heat pump system for the vehicle of claim 7, wherein
in the operation of the valve with the second operation mode, the controller operates the valve so as to open the branched line and open the coolant line connected to the radiator based on the branched line.

9. The control method of the heat pump system for the vehicle of claim 7, wherein
in the recovering of the external heat from the heat-exchanger,
the heat-exchanger indirectly recovers the external heat recovered from the coolant through heat-exchange with the outside air while passing through the radiator through the heat-exchange of the coolant and a refrigerant.

10. The control method of the heat pump system for the vehicle of claim 7, wherein
if the recovering of the external heat from the heat-exchanger is completed,
the controller operates the air conditioner device with an optimal efficiency point and terminates the controlling.

* * * * *